July 28, 1964  J. W. SESSUMS, JR  3,142,152
HYBRID ROCKET MOTOR
Filed June 22, 1962  2 Sheets-Sheet 1

INVENTOR.
JOHN W. SESSUMS JR.
BY
Herbert E. Kidder
AGENT

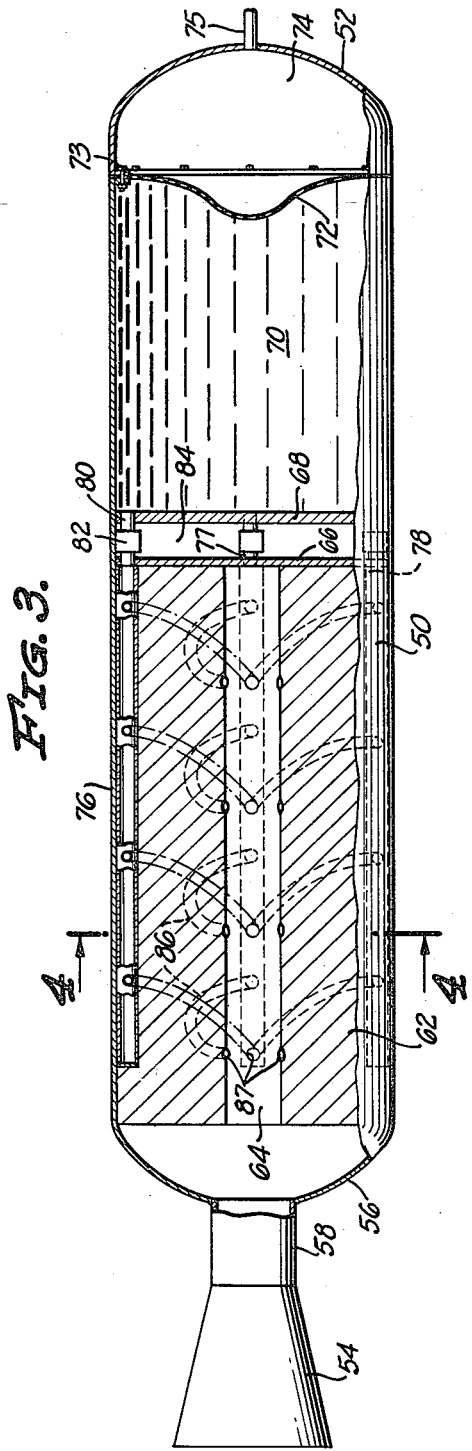

United States Patent Office 3,142,152
Patented July 28, 1964

3,142,152
HYBRID ROCKET MOTOR
John W. Sessums, Jr., Redlands, Calif., assignor, by mesne assignments, to Lockheed Aircraft Corporation, Burbank, Calif., a corporation of California
Filed June 22, 1962, Ser. No. 204,589
10 Claims. (Cl. 60—35.6)

The present invention relates generally to rocket motors, and more particularly to a unique class of rocket motors known as "hybrid" rocket motors, since the propellant is neither a solid nor a liquid, as in conventional rockets, but instead is a combination of both solid and liquid propellant components. The purpose of this arrangement is to enable certain combinations of extremely high energy fuel and oxidizer to be used, where one of them is normally in the solid state and the other is normally liquid, so as to attain maximum specific impulse. Customarily, the solid component is the fuel and the liquid component is the oxidizer, but this is not necessarily true of all fuel/oxidizer combinations. Moreover, a solid fuel might contain a limited amount of solid oxidizer to facilitate ignition, or the liquid oxidizer might contain a limited amount of liquid fuel, but in ether case, the solid and liquid components would be primarily fuel or oxidizer, respectively. It should be understood that the invention is not limited to any fuel-oxidizer combination. Hypergolic reactants may be utilized or if preferred any of the conventional reactants utilizing standard igniters may be used.

The primary object of the present invention is to provide a new and unique arrangement for bringing the liquid component into intimate contact with the solid component directly at the burning surface during the entire combustion period. This is a difficult feat to accomplish, because the geometry of the solid charge constantly changes as the grain is consumed, and it is necessary to change the location and direction of the liquid discharge nozzle in order to follow the rapidly receding burning surface. With the present invention, this is accomplished by conveying the liquid component through a series of tubes, or conduits, which are embedded in the solid grain and terminate in discharge ends that are flush with the burning surface and are directed so that the liquid is discharged directly over the burning surface. As the surface of the solid grain recedes, the projecting ends of the liquid supply tubes burn back at the same rate, so that the discharge ends of the tubes are always flush with the burning surface. Also, the tubes are shaped so that as the burning surface recedes and the ends of the tubes burn back, the angle or direction at which the tube discharged the liquid onto the burning surface remains the same. Being completely embedded within the solid grain, the tubes are shielded from the extremely hot combustion gases except for the extreme terminal end, which therefore tends to burn back at the same rate as the solid component.

Other objects and advantages of the present invention will become apparent to those skilled in the art upon consideration of the following detailed description of the preferred embodiment thereof, reference being had to the accompanying drawings, wherein:

FIGURE 3 is a longitudinally sectioned view of another form of the invention, in which the burning surface of the solid component is defined by a central, longitudinally extending combustion port; and FIGURE 4 is a transverse sectional view, taken at 4—4 in FIGURE 3.

Figure 1:
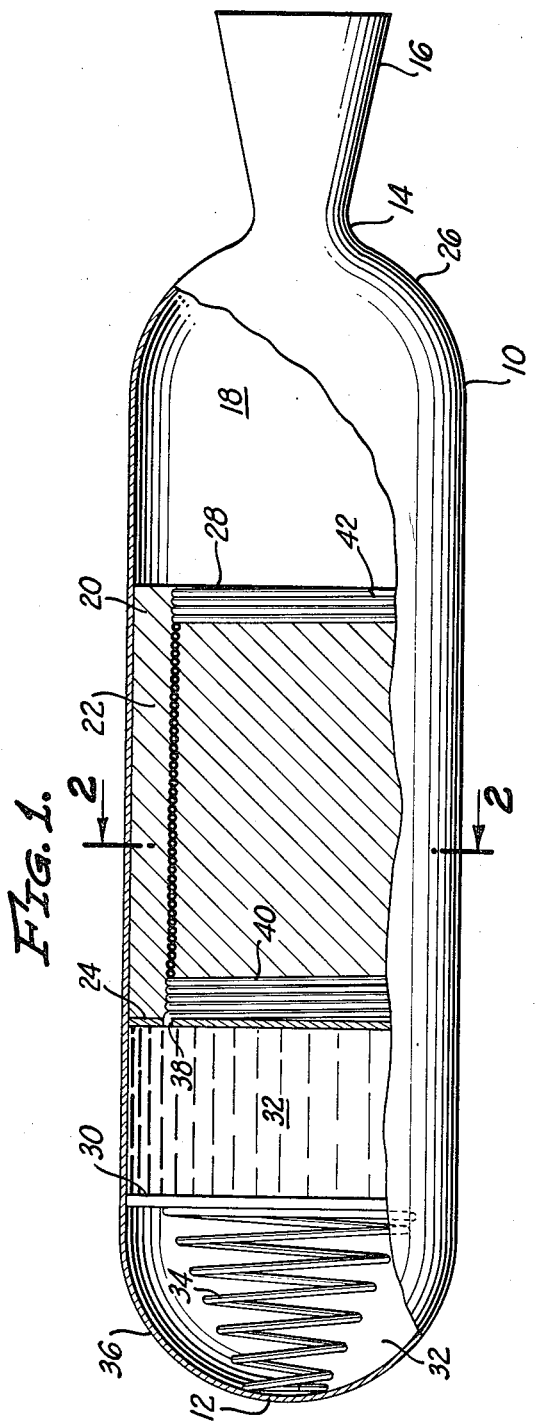
FIGURE 1 is a partially cut-away side elevational view of a hybrid rocket motor embodying the principles of the invention, as applied to an end-burning grain of solid propellant component.
Figure 2:
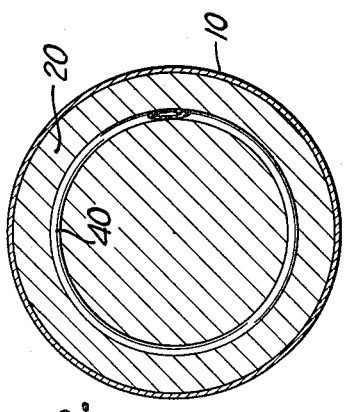
FIGURE 2 is a transverse sectional view of the same, taken at 2—2 in FIGURE 1.

In FIGURES 1 and 2 of the drawings, the rocket motor comprises a tubular casing 10 having its front end closed at 12, and terminating at its rear end in a restricted throat 14 and rearwardly directed expansion nozzle 16. Within the aft end of the casing 10 is a combustion chamber 18, where the combustion gases are generated by the burning of the solid and liquid components, and these combustion gases are discharged at high velocity through the expansion nozzle 16, to produce thrust reaction on the rocket motor.

The interior of the casing 10 is divided by a transverse partition member 24 into front and rear compartments, the rear compartment 22 being loaded with an elongated cylindrical grain 20 of solid propellant component. The rear face 28 of the grain 20 is perpendicular to the longitudinal axis of the motor casing, and this face 28 constitutes the burning surface of the grain 20. The combustion chamber 18 is thus bounded on the front by the burning surface 28, and on the rear by the after end 26 of the motor casing 10 and its throat 14 and nozzle 16, and on the sides by the side walls of the casing 10.

The forward compartment of the motor casing 10 is designated at 32, and slidably disposed within this compartment is piston 30. The space between the piston 30 and the partition member 24 constitutes the liquid storage compartment, in which the liquid propellant component is carried. The liquid within the compartment 32 is pressurized by any suitable means, such as the spring 34 located between the nose 36 of the motor casing and the piston 30, which presses against the latter with considerable force.

The partition member 24 is apertured at 38, and connected into this aperture is one end of a helically coiled tube, or conduit 40, which is embedded within the grain 22 of solid component. The other end 42 of the conduit 40 is flush with the surface 28 and it will be obvious from FIGURE 1 that as the surface 28 recedes and the end 42 of the conduit 40 burns back, the discharge end 42 of the conduit 40 burns back, the discharge end 42 moves around in a circle as it retreats along the length of the helically coiled conduit. The liquid from the compartment 32 is discharged laterally over the burning surface 28 of the solid reactant 20, and thus as the discharge end 42 retreats, it produces the effect of a rotating spray head, covering the entire burning surface 28 with each turn of the helix. There may be any number of separate conduits 40, which would preferably be wound into the same helix and have their discharge ends 42 equidistantly spaced apart.

The pressure exerted by the spring 34 is such that the entire supply of liquid component is used up simultaneously with the exhaustion of the solid component 20. The flow of liquid component can, of course, be throttled if desired for the purpose of programming the thrust, in which case the rate of combustion varies as a function of the rate of flow of the liquid.

In the embodiment of FIGURES 3 and 4, there is again provided a tubular casing 50 having a closed, dome-shaped forward end 52, and an aft end consisting of a flared expansion nozzle 54 which is connected to the rear end wall 56 of the casing by a generally cylindrical nozzle throat 58. Loaded into the rearward half of the casing 50 is a tubular grain 62 of solid reactant, having a longitudinally extending, central bore 64 which lies ahead of and in alignment with the nozzle throat 58. The bore 64, also known as a combustion port, constitutes a central combustion chamber for the surrounding thickness of solid reactant. Combustion takes place over the entire surface of the bore 64, and the burning surface recedes more or less uniformly as combustion proceeds.

Fixed to the inside of the motor casing 50 at the forward end of the solid reactant grain 62, are two parallel transverse partitions 66 and 68, which are spaced apart a slight distance. The rearward partition 66 serves as a firewall for the combustion port 64, as well as a container end for the solid reactant. The adjacent partition wall 68 provides a fixed head wall for a liquid reservoir 70, in which the liquid component is carried. At the front end of the reservoir 70 is a transversely disposed, flexible diaphragm 72 which is secured around its edges by an inwardly projecting annular flange 73. The flexible diaphragm 72 comprises, in effect, a movable wall which is adapted to conform to the volume of liquid as the latter is discharged. Between the flexible diaphragm 72 and the front end of the motor casing is a nose compartment 74 that is adapted to be pressurized with an inert gas, such as nitrogen, so that the diaphragm 72 is inflated and caused to bear against the liquid with considerable pressure. Gas for pressurizing the compartment 74 may be introduced through a pipe 75.

Extending lengthwise along the surface of the tubular grain 62 of solid reactant are four parallel manifolds, or headers 76, 77, 78 and 79, which may be embedded in the solid reactant, as shown in FIGURE S3 and 4, or they may lie external to the reactant grain. Each manifold is connected at one end to the liquid reservoir 70 by means of a coupling 80 that is inserted into a corresponding aperture in the wall 68 adjacent the outer margin thereof. Downstream from the coupling 80 is a flow control valve 82, which is also located within the insulating compartment formed by the partitions 66 and 68. The number of manifolds may be more or less than the four shown in the drawings, and preferably should be spaced equidistantly apart from one another.

Connected into each of the manifolds are a plurality of longitudinally spaced, laterally evtending, spiral tubes, or conduits 86, which are embedded within the grain of solid reactant 62. Each of the tubes 86 spirals both inwardly and rearwardly, i.e., toward the nozzle end of the motor, and therefore might be termed a spiral helix. As in the preceding embodiment, the discharge end 87 of each of the tubes 86 lies flush with the burning surface 64. The axial distance advanced by each of the tubes 86 between its point of attachment to the manifold and its discharge end 87 is preferably the same as the distance between adjacent tubes on the same manifold. As best shown in FIGURE 4, the tubes 86 are arranged so that they discharge the liquid more or less tangentially over the cylindrical surface 64, and this tangential discharge continues throughout the entire burning period, as the surface 64 recedes and the projecting ends of the tubes burn back. As the combustion port 64 grows larger, the fluid direction of the discharge rotates, due to the spiral shape of the tubes.

The currently used elastomeric-base solid reactants, which may also contain metallic additives, have combustion temperatures of the order of 6000° F., which is sufficiently high to melt most commonly used materials. However, being embedded in the body of solid reactant, the tubes are shielded from this high combustion temperature, and therefore even plastic tubes may be used. As fast as the discharge ends of the tubes are exposed by the receding burning surface, the projecting ends are burned away flush with the burning surface.

While I have shown and described in considerable detail two illustrative embodiments of my invention, it is not intended that the invention be limited to such details, and various changes may be made in the shape and arrangement of the several parts without departing from the scope of the invention as defined by the following claims.

I claim:

1. In a hybrid rocket motor having a first compartment loaded with a solid reactant and a second compartment filled with a liquid reactant, said solid reactant having a burning surface which recedes as combustion progresses, the improvement comprising a tubular conduit embedded in said solid reactant, one end of said conduit being connected into said second compartment and the other end thereof being disposed flush with said burning surface, said conduit being formed so that it is progressively and uniformly exposed to combustion temperatures as said burning surface recedes, said exposed end being burned away flush with said burning surface, and means for forcing said liquid reactant through said conduit and onto said burning surface.

2. A hybrid rocket motor as defined in claim 1, wherein there is a plurality of tubular conduits connected into said second compartment and terminating at said burning surface, said conduits being spaced apart equidistantly from one another, and each of said conduits being similarly formed so that they all recede at substantially the same rate.

3. A hybrid rocket motor as defined in claim 1, wherein said conduits are formed so that said liquid reactant is discharged over said burning surface substantially parallel thereto.

4. A hybrid rocket motor as defined in claim 1, wherein said conduit is curved into the form of a helix.

5. A hybrid rocket motor as defined in claim 1, wherein said conduit is curved into the form of a spiral.

6. A hybrid rocket motor as defined in claim 1, wherein said conduit is curved into the form of a spiral helix.

7. A hybrid rocket motor having a first compartment loaded with an end-burning solid reactant and a second compartment filled with liquid reactant, the burning surface of said end-burning solid reactant receding as combustion progresses, a helically coiled tubular conduit embedded within said solid reactant, one end of said conduit being connected into said second compartment and the other end thereof being disposed flush with said burning surface, said other end being progressively and uniformly exposed to combustion temperatures as said burning surface recedes, said exposed end being burned away flush with said burning surface, and means for forcing said liquid reactant through said conduit and onto said burning surface.

8. A hybrid rocket motor having a first compartment loaded with a solid reactant and a second compartment filled with a liquid reactant, said solid reactant having a longitudinally extending central bore which constitutes the burning surface, said burning surface receding radially outward as combustion progresses, a plurality of tubular conduits spaced apart longitudinally along the length of said solid reactant, said conduits being embedded within said solid reactant and extending in a smooth spiral curve from the outer surfaces of said solid reactant to said central bore, the inner ends of said conduits being flush with the burning surface, and the outer ends thereof being connected to said second compartment, and means for forcing said liquid reactant through said conduits and onto said burning surface, said inner ends of said conduits being progressively exposed and burning away flush with said burning surface as the latter recedes.

9. A hybrid rocket motor having a first compartment loaded with solid reactant, and a second compartment filled with liquid reactant, said solid reactant having a longitudinally extending central bore which constitutes the burning surface, said burning surface receding radially outward as combustion progresses, at least two manifolds extending parallel to said central bore adjacent the outer surface of said solid reactant, each of said manifolds being closed at one end and connected at the other end to said second compartment, a plurality of tubular conduits connected to said manifolds at longitudinally spaced intervals along the length thereof, each of said conduits being embedded within said solid reactant and extending in a spiral curve from said manifolds in toward said central bore, the inner end of each of said conduits terminating flush with the burning surface, said inner ends of said conduits being progressively exposed and burned away flush with said burning surface as the latter recedes, and means for forcing said liquid reactant through said conduits and onto said burning surface.

10. A hybrid rocket motor having a first compartment loaded with solid reactant and a second compartment filled with liquid reactant, said solid reactant having a longitudinally extending central bore which constitutes the burning surface, said burning surface receding radially outward as combustion progresses, a plurality of equidistantly spaced manifolds extending parallel to said central bore adjacent the outer surface of said solid reactant, each of said manifolds being closed at one end and connected at the other end to said second compartment, a plurality of tubular conduits connected to said manifolds at longitudinally spaced intervals along the length thereof, each of said conduits being embedded within said solid reactant and extending in a spiral helix from said manifolds in toward said central bore, the inner end of each of said conduits advancing along the axial direction of said solid reactant by a distance approximately equal to the space between said conduits and terminating flush with the burning surface, said inner ends of said conduits being progressively exposed and burned away flush with the burning surface as the latter recedes, and means for forcing said liquid reactant through said conduits and onto said burning surface.

References Cited in the file of this patent

UNITED STATES PATENTS

| | | |
|---|---|---|
| 2,753,801 | Cumming | July 10, 1956 |
| 2,974,484 | Cooley | Mar. 14, 1961 |
| 3,017,748 | Burnside | Jan. 23, 1962 |